June 11, 1957 R. C. WILKIE 2,795,051
APPARATUS FOR INDICATING AND RECORDING VARIATIONS
OF SLIVER THICKNESS
Filed Dec. 30, 1950 8 Sheets-Sheet 1

Robert C. Wilkie
Inventor
by
Attorney

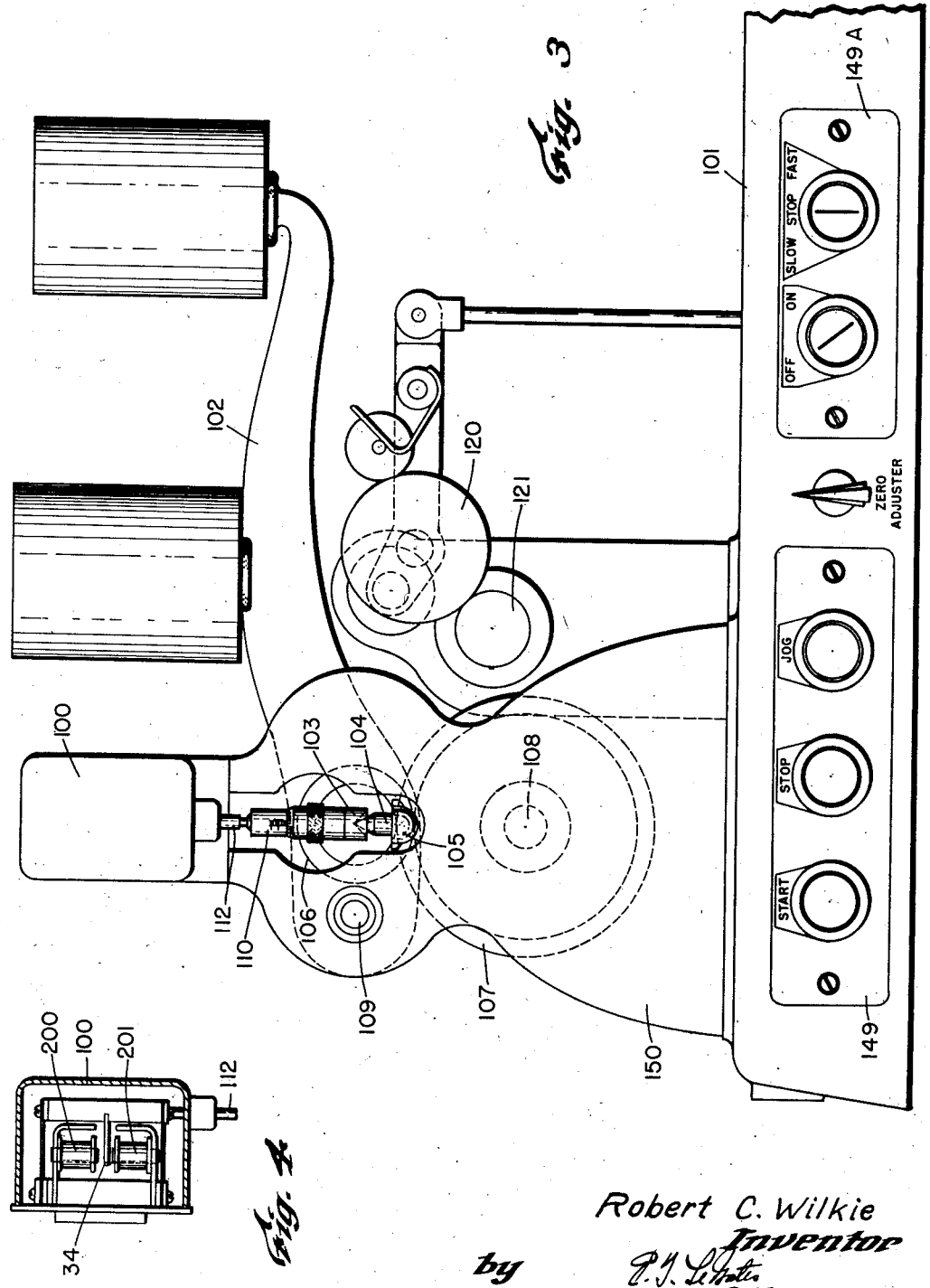

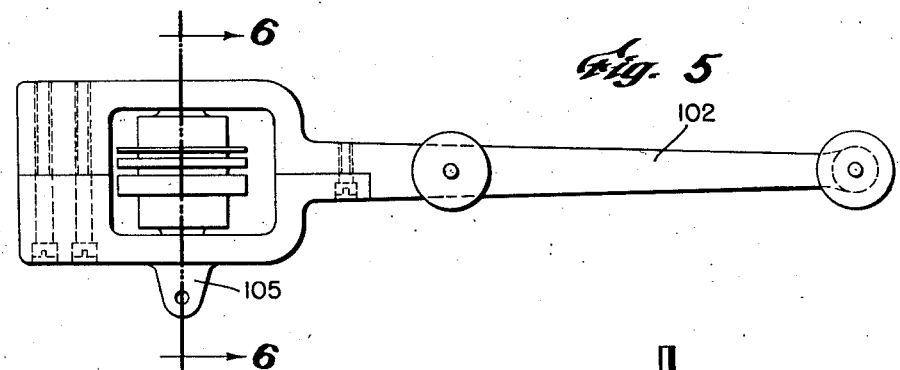
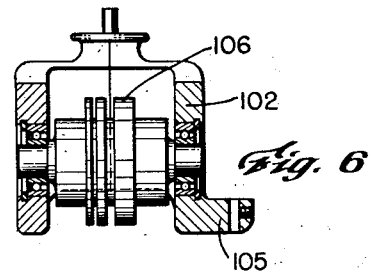
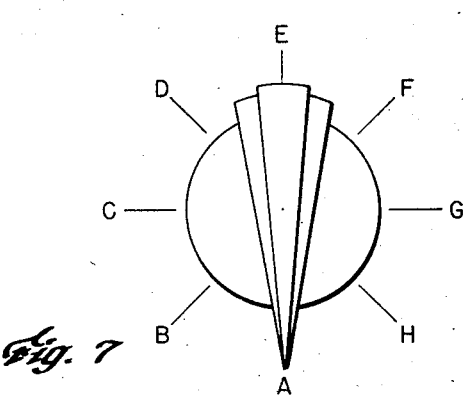
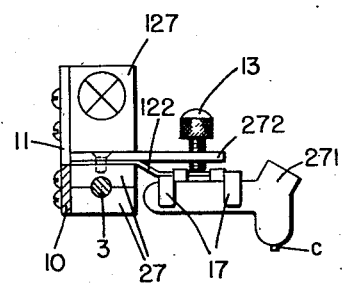
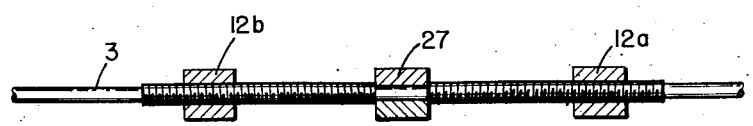

June 11, 1957 R. C. WILKIE 2,795,051
APPARATUS FOR INDICATING AND RECORDING VARIATIONS
OF SLIVER THICKNESS
Filed Dec. 30, 1950 8 Sheets-Sheet 5
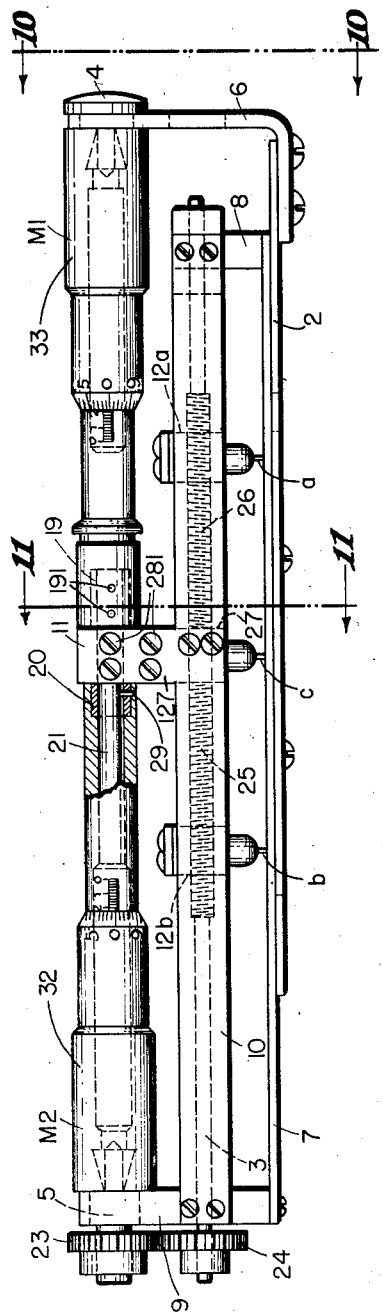
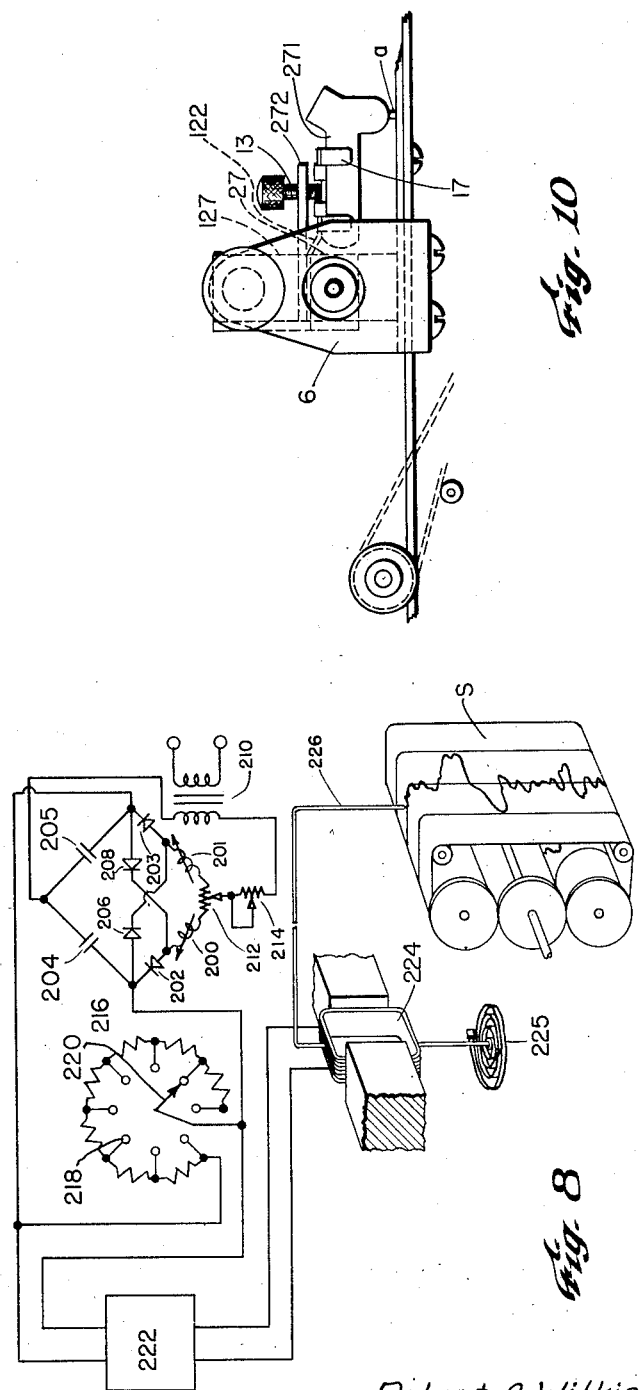
Robert C. Wilkie
Inventor

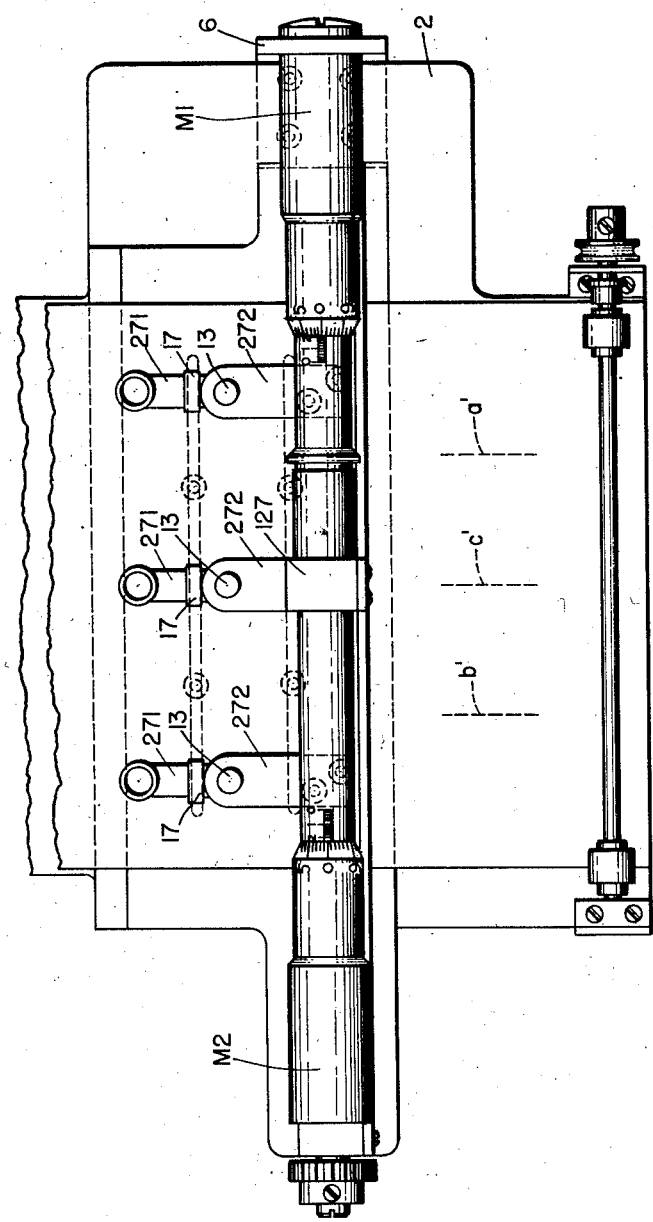

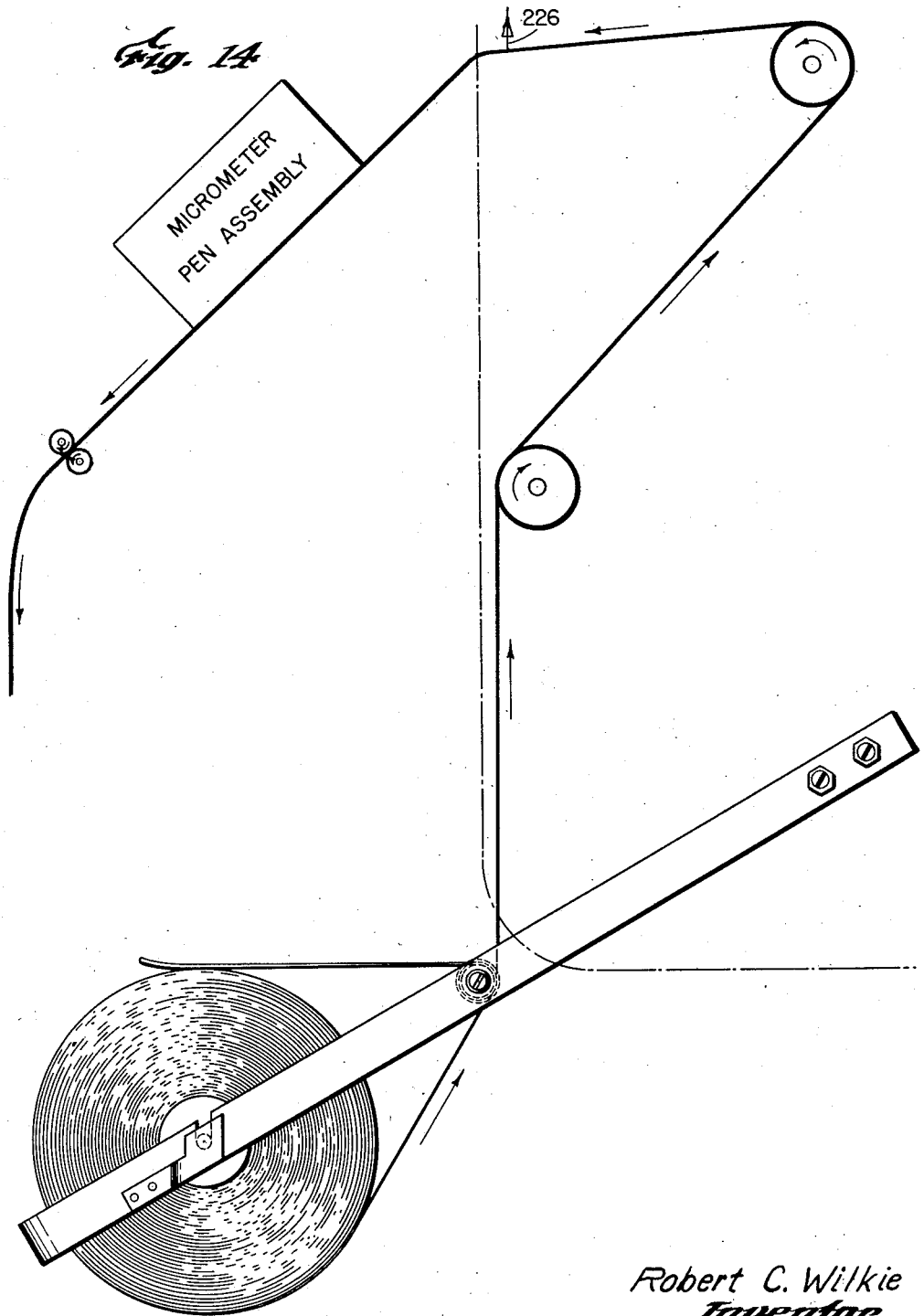

Robert C. Wilkie
Inventor

United States Patent Office 2,795,051
Patented June 11, 1957

2,795,051

APPARATUS FOR INDICATING AND RECORDING VARIATIONS OF SLIVER THICKNESS

Robert C. Wilkie, Andover, Mass., assignor to Pacific Mills, Lawrence, Mass., a corporation of Massachusetts Application December 30, 1950, Serial No. 203,642

11 Claims. (Cl. 33—148)

This invention relates to improvements in apparatus for indicating and recording variations in sliver or yarn thickness, particularly to an apparatus by which the average weight per unit length and the average diviation from the mean may be determined without recourse to mathematical calculations or other complicated methods for interpreting the curves produced by the apparatus.

This invention is particularly applicable to the type of evenness tester described in Patent No. 1,540,969, issued June 9, 1925, to E. D. Walen and A. M. Parsons, wherein a sliver is passed between rolls, the top roll being mounted on a pivoted arm which is raised by the sliver and operates a pen to record the thickness of the sliver on a moving sheet of paper.

According to my invention fluctuations in the sliver thickness cause a similar arm to rise and fall and through connecting means to vary the current in an electric circuit. By "sliver" I refer herein to any fibrous textile strand the thickness or unevenness of which is to be tested.

This current operates a recording pen which draws a line, corresponding to the fluctuation in the sliver thickness, on a chart sheet of paper which is fed under the pen at a predetermined rate of speed.

According to my invention there are also three pens which draw three parallel lines on the chart sheet of paper: a center line which indicates the mean desired thickness of the sliver, and two lines equidistant from the center line, which indicate the limits of the permissible fluctuations of the sliver thickness. These three pens are adjustable together without varying the distances between the lines marked by them and the two outside pens are together adjustable to vary the distance of the lines drawn by these pens from the center line.

In the drawings:

Fig. 3 is a front elevation of the tongue and groove roll assembly operated by the thickness of the sliver;

Fig. 4 is a view of the gage head;

Fig. 5 is a plan view of the lever operated by the rolls;

Fig. 6 is a sectional view on the line 6—6 of Fig. 5 showing the upper tongued roll;

Fig. 7 is a diagram of the amplification dial;

Fig. 8 is a diagram of the means for operating the recording pen;

Fig. 9 is a front elevation of the micrometer pen assembly for drawing the parallel lines on the chart sheet;

Fig. 10 is a view on line 10—10 of Fig. 9;

Fig. 11 is a view on line 11—11 of Fig. 9;

Fig. 12 is a view of the shaft with the reverse threads of Fig. 9;

Fig. 13 is a plan view of the micrometer pen assembly and the table supporting the chart sheet;

Fig. 14 is a side view of the means for feeding the chart sheet;

Figure 1:
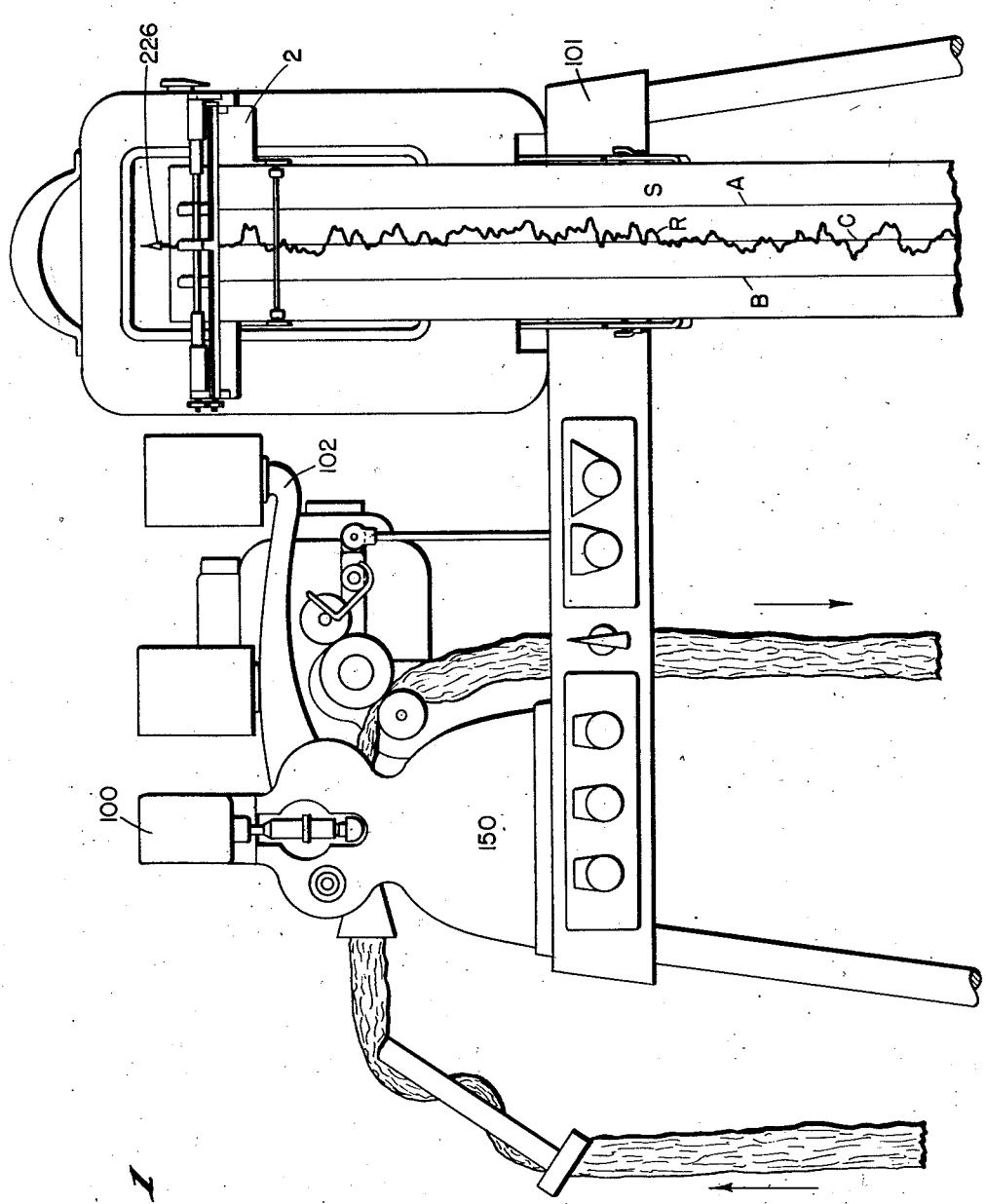
Fig. 1 is a front elevation of the apparatus.

The base 101, Fig. 1, supports the casting 150 in which is mounted the lower grooved roll, the gage head 100 and the lever in which is mounted the upper tongued roll. On the base is also mounted the gage head bridge, D. C. amplifier, recording unit and the micrometer pen assembly, Fig. 2.

Figure 2:
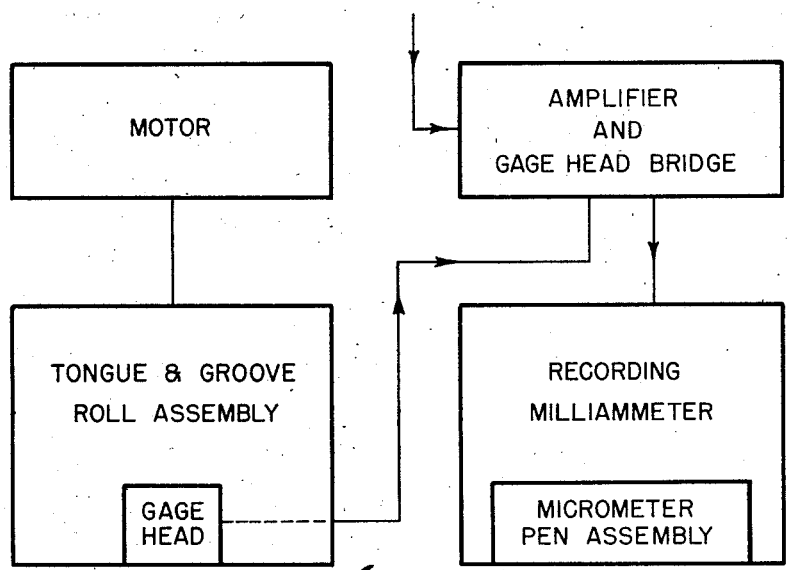
Fig. 2 is a diagram in plan view of the several parts of the apparatus.

In the casting 150 is journalled the grooved roll 107 on the shaft 108, Fig. 3, which is driven by a motor, Fig. 2, mounted on the casting 101. The tongued roll 106, Fig. 6, is journalled in the lever arm 102 which is pivoted at 109 in the casting. The control panels 149 and 149-A are contained in a downwardly extending flange of the base 101.

In the use of the apparatus the test material, shown as sliver, Fig. 1, is guided into the nip of the rolls, 106 and 107, Fig. 3, and is drawn off by the rolls 120 and 121; the latter is positively driven and roll 120 is friction driven. As the sliver lifts the roll 106, it lifts the gage link 110, Fig. 3, which is in the form of a micrometer supported on the shelf 105 which projects from the side of the lever 102, Fig. 5. The conical pin 104, Fig. 3, on the shelf 105 supports the inverted conical piece 103 fastened to the base of the micrometer. The link 110 is graduated as hown in Fig. 3 to indicate its adjusted length. The micrometer is set at zero when the apparatus is empty and is later adjusted as the sliver flows through it as later pointed out.

The movement of the grooved roll 106 up and down, as the material passes between the rolls 106 and 107, is transferred through the link 110 to the spindle 112 of electro-magnetic displacement gage 100, which is similar to the type described in the Hathaway Patent No. 2,240,184, April 29, 1941. The rise and fall of the roll 106 causes a like movement in the movable armature 34, Fig. 4, normally spaced between the coils 200 and 201 of the gage, thus varying the air gaps and hence the electrical characteristics of the coils as described and shown in the above mentioned Hathaway patent. The coils 200 and 201 of gage 100 are connected to and form a part of the gage head bridge circuit, Fig. 8.

As shown in Fig. 8, the two coils 200 and 201 of the electromagnetic gage 100 each form, together with rectifiers 202 and 203 in series connection with said coils, a leg of a gage head bridge circuit, the other two legs of said bridge circuit comprising capacitors 204 and 205 of equal value. Two more rectifiers 206 and 208 are connected between the first two legs of said bridge circuit, the rectifier 206 being connected between the junction of coil 201 and series rectifier 203, and the junction of capacitor 204 and series rectifier 202, and the rectifier 208 being connected between the junction of coil 200 and series rectifier 202 and the junction of capacitor 205 and series rectifier 203. Alternating current power is supplied to the bridge circuit through a transformer 210, the secondary winding of said transformer being connected on one side to the junction of capacitors 204 and 205, and on the other side to the junction of coils 200 and 201. If desired, the connection of the secondary of transformer 210 to the junction of coils 200 and 201 may be made through the movable tap of a potentiometer 212 connected between said coils for zero adjustment of the bridge circuit, while a sensitivity adjustment may be provided by a rheostat 214 in series with the connection between the secondary of said transformer 210 and the potentiometer 212.

A tapped shunt resistor 216, preferably having six taps between the ends thereof, is provided between the junction of capacitor 204 and rectifiers 202 and 206, and the junction of capacitor 205 and rectifiers 203 and 208, one of the taps at one end of said resistor being connected to a direct current amplifier 222, and all of the taps being connected to the fixed terminals 218 of a switch, said switch preferably having eight fixed terminals designated A to H, A being connected directly to the amplifier 222, Figs. 7 and 8, the movable terminal 220 of said switch also being connected to the amplifier 222. The movable terminals 220 may be operated by a knob on the dial on the side of the casing containing the bridge circuits, Fig. 7.

The direct current amplifier 222 is of a type well known to the art in which a very small direct current may be amplified and used to drive a motor 224, centered by a spring 225, which operates pen 226 to correspond to the deflection of the gage 100.

The operation of the bridge circuit to produce a direct current output for the amplifier may best be explained in terms of an example, for instance, assuming that the impedance of coil 201 is greater than that of coil 200 due to a change in the air gap between them caused by the movement of electromagnetic gage armature 34, then during the half cycle of the alternating current input to the bridge circuit in which the voltage at the junction of coils 200 and 201 is positive, and that at the junction of capacitors 204 and 205 is negative, the current flowing through coil 201 and rectifier 203 places a charge on capacitor 205. Since the impedance of coil 200 is smaller than that of coil 201, a larger current flows through coil 200 and rectifier 202 placing a greater charge on capacitor 204. Thus, since capacitor 204 has a greater charge than capacitor 205, a current flows through shunt resistor 216 in the direction from the junction of capacitor 204 and rectifiers 202 and 206, to the junction of capacitor 205 and rectifiers 203 and 208.

During the next half cycle when the voltage at the junction of coils 200 and 201 is negative, and that at the junction of capacitors 204 and 205 is positive, capacitor 204 discharges through rectifier 206 and coil 201, and capacitor 205 discharges through rectifier 208 and coil 200. Since the impedance of coil 201 is greater than that of coil 200, capacitor 205 will be more negative than capacitor 204 and current will again flow through shunt resistor 216 in the direction from the junction of capacitor 204 and rectifiers 202 and 206 to the junction of capacitor 205 and rectifiers 203 and 208, thus the current through shunt resistor 216 is unidirectional.

On the other hand, if the position of the electro-magnetic gage armature 34 is such that the impedance of coil 200 is greater than that of coil 201 a similar but opposite action occurs producing a direct current flow through shunt resistor 216 in the direction opposite to that produced when the impedance of coil 201 is greater than that of coil 200 as described above.

The tapped resistor 216 and its associated switch comprising fixed terminals 218 and movable terminal 220 provide a means of decreasing the sensitivity of the gage 100, and its associated bridge circuit in order to accommodate slivers in a large variety of sizes. For instance, since the allowable variation in a sliver of large size is much greater than the allowable variation in a sliver of small size, when large slivers are to be tested the switch is adjusted to supply a relatively small fraction of the output current of the bridge circuit to the milliammeter 222, while if small slivers are to be tested, maximum sensitivity may be used by adjusting the switch to the position at which the maximum output current will be supplied to the milliammeter. Thus, I am enabled to measure a great range of sizes of slivers by the use of a single instrument, and still maintain the sensitivity necessary to measure the variations in small slivers.

The apparatus is capable of testing evenness and of determining the weight of sliver, roving and yarn through a range from 4.5 ounces per five yards wool sliver to 100s worsted yarn, or the equivalent in any other fiber.

For this purpose two sets of tongue and grooved roll assemblies, interchangeable as a unit, are provided. Each set of tongued and grooved rolls 106 and 107 contains three tongues of different widths and three corresponding grooves, to provide a usable range for all such sizes of sliver, roving and yarn.

The set for testing slivers and rovings from 4.5 ounces per five yards top to 7.5 hank worsted roving, or the equivalent, has groove widths of 5/16", 1/8", and 1/32". The set for testing yarn has groove widths of .006", .009", and .012" to cover a range of 1/7.5s to 1/100s worsted count or the equivalent.

To compress the material in this range, I provide two weights which are detachably mounted on the lever arm 102 and are used for proportionately weighting the top roll 106 according to the groove being used. Both weights are mounted on the lever when using the 5/16" groove. When using the 1/8" groove, one weight nearer the rolls is used. When the 1/32" groove is used no weight is required as the weight of the arm is sufficient to compress the roving adequately in this groove.

For the effective use of material in the above given range, I provide seven stages of amplification B to H with the minimum at station B and gradually increasing to the maximum at station H which can be set by the knob and dial shown in Fig. 7.

In testing sliver the degree of magnification is of the order of 80 × at B and 600 × at H, while in testing yarn it is at B about 120 × and at H it approximates 1000 ×.

A casing mounted on the base, Fig. 1, contains the means for feeding the chart paper S and the pen 226 which marks the record R of the variations of the thickness of the sliver on the chart.

Figure 16:
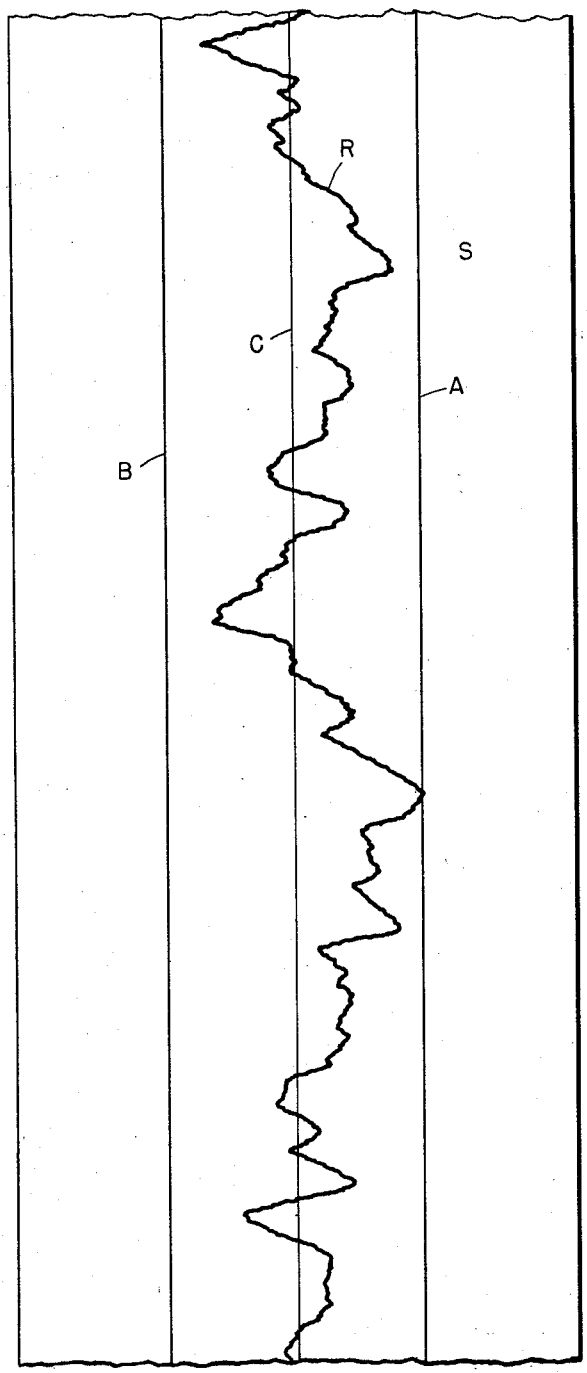
Fig. 16 is a plan view of a chart sheet.

On the front of the casing is a shelf 2, Figs. 1 and 13, on which is mounted the micrometer pen assembly which controls pens $a$, $b$, and $c$, Fig. 9, which draw the straight lines A, B, and C on the chart, Fig. 16.

The shelf 2, Fig. 9, has an angle bracket 6 rigidly mounted at one end. The plate 7 is slidably attached to shelf 2. Two blocks 8 and 9 are fastened to the plate 7 and to the flat strip 10. The strip 10 has an extension 11 to which is fastened a block 27, shown in dotted lines in Fig. 10 by screws 281, Fig. 9.

Micrometer M1 is journalled in the angle bracket 6 by means of the shoulder screw 4 and is pinned by pins 191 to splined shaft 21 which enters a bushing 19 set into the barrel of the micrometer. The splined shaft is fixed to the block 27 by the screws 281.

Micrometer M2 is journalled in block 9 by means of the stud 5 which screws into the end of the micrometer. A bushing 20 is set into the barrel of the micrometer. The shaft 21 passes through the barrel. A pin 29 in the bushing 20 engages in the spline in shaft 21 and prevents rotation of the barrel of micrometer M2, but allows free relative lengthwise movement of the barrel and the shaft.

A gear 23 carried by stud 5 meshes with gear 24 fastened on shaft 3 which is journalled in blocks 8 and 9. The shaft 3 has right-hand threads 25 on the left part of its length and left-hand threads 26 on the right part of its length. Blocks 12$a$ and 12$b$ engage the threaded portions 26 and 25 with corresponding internal threads (Fig. 12) and are prevented from rotating by bearing against the flat strip 10. The blocks 12$a$ and 12$b$, and 27 have means for holding the pens $a$, $b$, and $c$, respectively against the chart paper. Each block has an arm 272, Fig. 11, and a spring 122 which supports clips 17 in the mounting of the pen. The block 27 is mounted on strip 10 and carries a flat spring 122, held between the block 27 and arm 272. The clips 17 embrace the spring 122. The arm 272 fixed to the top of block 27 supports a screw 13 which bears on the leaf spring 122 and can be adjusted to press the pen against the chart. The pens $a$ and $b$ are always equidistant from the center pen $c$.

Both micrometers are of the well known "inside" type, having graduations thereon, as appears in Figs. 9 and 13, showing their adjusted length. When the thimble 33 of micrometer M1 is turned, Fig. 9, the barrel moves in or out and carries with it the bushing 19 to which is rigidly fastened block 127 secured to extension 11 of strip 10 to which the plate 7 with the blocks 8 and 9 is fastened. When the plate 7 slides laterally on shelf 2, the three blocks and their pens move together to the left or right, and the reading of the graduations on micrometer M1 indicate how far above or below the mean of the graph the center pen has been moved.

When the thimble 32 of micrometer M2 is turned, the barrel slides along the shaft 21, without moving block 127 and thus without moving the pen $c$. However, the gear 23 turns gear 24 and shaft 3. Inasmuch as blocks 12a and 12b cannot turn, they follow their respective threads, and the pens $a$ and $b$ either approach each other or separate more widely equally.

The reading of the graduations micrometer M2 show how far pens $a$ and $b$ are from the center, or the reading, times 2, shows how far the pens $a$ and $b$ are apart from each other, that is the total permissible deviation on the graph.

The recording pen 226, Fig. 1, which is operated by the thickness of the sliver, yarn or roving, draws the line R, Fig. 16, corresponding to that thickness, between the two lines A and B made by the side pens $a$ and $b$ and from side to side over the line C drawn by the center pen $c$.

Figure 15:
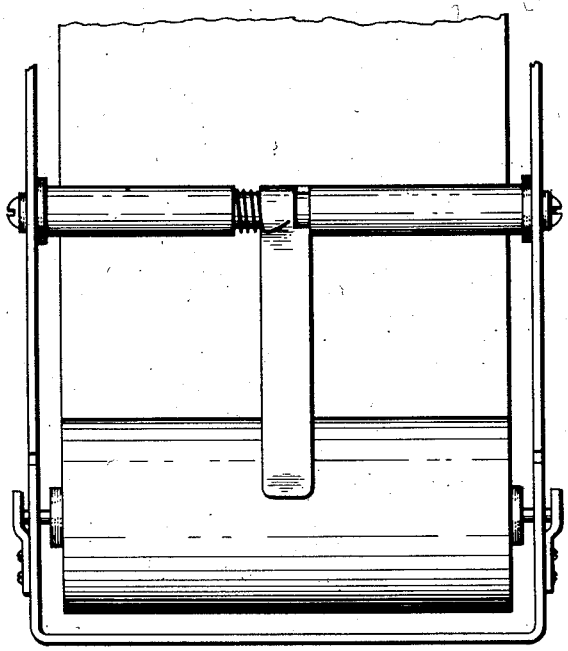
Fig. 15 is a plan view of a part of the means for delivering the chart sheet.

The roll of paper is carried on a roller supported in arms on the sides of the casing containing a motor and roll driven thereby for feeding the paper, Figs. 14 and 15. The sheet of paper passes under the micrometer pen assembly on the shelf 2 and to delivery rolls from which the sheet falls.

In the operation of this device there are several procedures dependent upon the information desired, i. e.

1. Control—to determine if a particular sliver or yarn falls within set standards of uniformity and/or weight per unit length.

2. To determine how much a given sliver or yarn is above or below the standards for uniformity and/or weight per unit length.

3. To determine the weight per unit length and/or uniformity of an unknown sliver or yarn.

In the use of the apparatus the electrical zero should first be checked. Set the amplification range indicator, Fig. 7, to station A. The recorder pen 226 should then mark a line on the graph paper which exactly coincides with the center scratch line $c'$ which is marked on the shelf 2, Fig. 13, just below the micrometer pen assembly. Then the apparatus is electrically correct.

To set the pens $a$, $b$, and $c$, set the micrometer M1, which controls the setting of the center or thickness pen $c$ on zero. Adjust the pen by actually turning the pen in its holder until it records a line exactly on top of the electrical zero line.

The micrometer M2, which controls the side or limit pens, $a$ and $b$, should then be turned until it reads one inch. Both pens should then coincide with the outer lines $a'$ and $b'$ marked on the shelf 2, Fig. 13, just below the micrometer pen assembly.

To set the gage zero: with the thickness pen micrometer M1 set on zero and the apparatus running empty, the gage head link 110 set at zero and the amplification selector at the maximum H station, the recorder pen 226 should record a curve the base of which is just tangent to the zero set thickness line. If the recorder pen records a line out of the above position, it may be brought into correct position by turning the zero set switch either clockwise or counter-clockwise depending on the direction of the adjustment required.

After the above settings, the apparatus is completely calibrated and ready for testing any desired sliver, roving or yarn.

To start a test: select and adjust the creel for the material to be tested and set the gage micrometer 110 at the estimated or standard thickness. Introduce the material into the nip of the rolls 106 and 107. Jog the motor until a full cross-section of the strand is in the roll nip. If the recorded graph made by pen 226 is equally above and below the center line C, the thickness of the sliver is equal to the reading of the gage link 110. Adjustment of the gage link may be made until the graph is centered on the line C and the thickness read from the gage link.

The mill should set up standards of weights versus true average thickness and of unevenness versus true average thicknesses. This is done by testing representative samples of the mill's various processes in numbers sufficient to be statistically representative. These tests should be on material which represents the accepted product of the mill. Simple graphs can be made for each groove in roll 106 showing the straight line relationship between the thickness and weight and between thickness and evenness. These relationships may also be expressed as formulae; i. e.

$$\frac{\text{Thickness}}{\text{Constant}} = \text{Weight}$$

or $$\frac{\text{Constant}}{\text{Thickness}} = \text{Yarn numbers}$$

For production control work, the sight method of analysis is used which is rapid, accurate and obviates the need for lengthy calculations, or the services of a highly skilled technician.

In analytical, statistical or research work where actual figures and percentages of necessity must be determined and recorded, a more detailed and technical analysis is made of the charts produced.

In either of the above methods, the chart is examined as a whole, and its general characteristics observed. Regularly repeated fluctuations, or thickness changes, immediately point to mechanical defects, or improper adjustment of a machine over which the material has been processed. Such mechanical defects as bad rolls, torn or worn aprons, uneven roll pressure, faulty gearing, overdrafting, improper faller pinning, and other faults can be readily detected on sight. The length, shape and relative distances apart of the peaks and the valleys as indicated on the graph are sign posts leading to the cause of the trouble, if the processing is known.

A sample calculation in analytical work for percent unevenness follows:

A five yard length of 4.85 hank worsted roving was tested. It was passed through the 1/32" groove of the grooved roll 106. The graph on the chart was 15" long, i. e. 3" for each yard of roving.

The estimated average thickness of the roving was .0072" (being the mill standard for 4.85 hank worsted roving).

The gage link 110 of the particular apparatus used in this example reads to only three decimal places and accordingly was set at .007".

The amplification constant, station E, of 240 was used.

The difference between .0072" and .007", i. e. .0002", was added by the thickness pen micrometer M1, as is possible due to the magnification. Thus the actual setting of the thickness pen micrometer was $$.0002'' \times 240 = .0480''$$

The highest and lowest points on each 3" of the graph R were measured above and below the center line C on the chart. The + and − signs indicate the distance above and below the center line respectively.

| High | Low |
|---|---|
| +.50 | −.10 |
| +.35 | −.15 |
| +.60 | +.20 |
| −.35 | −.60 |
| +.55 | −.50 |
| +1.65 | −1.15 |

The average high and low per yard was +.33 and −.23, respectively.

Dividing by the amplification constant, 240 gave the actual average high and low per yard as +.00137" and −.00096".

In this case the "average high" +.00137" was numerically larger than the "average low" −.00096" which established the fact that the true thickness of the roving tested was greater than the estimated thickness for the 4.85 hank roving.

The total average deviation is the sum of the average high and the average low, namely .00233".

The true mean of the graph is one half of the above, namely .00117".

The difference between the average high and the true mean is .00137" minus .00117", i. e. .00020".

The figure .00020" represents the distance from the true mean to the center line drawn by the center pen. It must be remembered that the center line above referred to represents the standard average thickness, or the actual average displacement of the tester roll 106 by the material. The "true mean" has no reference to thickness, but merely represents the mean or the half-way point between the average high and the average low of the graph.

To sum up:

.00720" standard average thickness
.00020" distance from the true mean to "standard" thickness line .00740" true average thickness of the roving tested To obtain the percent average unevenness, divide the total average deviation, .00233" by the true average thickness, .00740" and multiply by 100. This gives 31.45% average unevenness.

To obtain the maximum percent unevenness, divide the sum of the highest high, +.60 and the lowest low, −.60 by the amplification constant, 240 and by the true average thickness, .00740" and multiply by 100, i. e.

$$\frac{1.20 \times 100}{240 \times .00740} = 67.56\% \text{ maximum unevenness}$$

An example of a sight method of weight and evenness determination is as follows:

When setting up the standards of average percent unevenness for various weights of material, the maximum percent unevenness should also be established by averaging the three highest and the three lowest points in a fifteen yard length. This equalizes freak fluctuations due to foreign matter or imperfections not inherent in the sliver itself.

The maximum percent unevenness is used to establish the outside limits within which the line R on the graph must fall to be considered up to standard. The outside limit lines A and B are drawn by the two outside pens $a$ and $b$, and the pens are adjusted by the left-hand micrometer M2 until the lines are the proper distance apart to register the maximum permissible deviation, as previously determined for the particular sliver or yarn being tested.

For control work using the sight method, the operator should have a list of the weights and sizes of material that may come within the scope of his work. Against each weight should be listed its corresponding thickness in the appropriate groove of the roll 106, its average percent unevenness, and the number on the left-hand micrometer M2 corresponding to the allowable outside limits to which the micrometer will be set. The procedure then is to set the gage link 110 and thickness micrometer M1 to register the desired thickness. The limit pen micrometer M2 is set to the correct number and the material passed between the rolls. If the resulting graph R is up to standard as to weight and evenness, it will be equidistant above and below the center line, and the whole graph will be between the limit lines. It can be readily observed if the material is too heavy or too light, or if the percent unevenness is higher than the standard percent unevenness.

I claim:

1. An apparatus for indicating the variations in the thickness of a fibrous strand which comprises a pair of tongue and groove rollers between which the strand is fed and confined under substantially constant pressure, a pivoted lever in which one of said rollers is journalled, a link adjustable in length adapted to be moved by said lever during operation of the apparatus along a line joining the axes of the rolls, graduations on said link indicating said changes in length and thereby the displacements of the rolls, means to vary the current in an electric circuit in accordance with the movements of said link, a pen to make a record of said movements, a sheet of paper, means to feed said sheet to receive said record, and means operated by said current to move said pen in accordance with the variations of said current to indicate on said sheet the variations of the thickness of said fibrous strand.

2. In an apparatus which indicates the variations in the thickness of a fibrous strand comprising a vertically displaceable, rotatable, tongued roll and a mating rotatable, but otherwise fixed, grooved roll, the combination of a micrometer adjustable to read in inches the estimated average thickness of the fibrous strand connected at one end for displacement with said roll during the operation of the device on a fibrous strand, linkage means connected to said micrometer and responsive to the vertical displacements of said micrometer and means to record graphically the movements of the linkage means.

3. An apparatus to record an amplification of the variations in the thickness of a fibrous strand comprising means to amplify said variations, a recording pen to mark undulations corresponding to said amplified variations on a sheet of paper moving past said pen, a center pen which marks on said sheet a straight line approximately along the center of said sheet, two side pens, one on each side of and at the same distance from said center pen, to mark straight lines on said sheet parallel to and equidistant from the line drawn by said center pen and means including a micrometer to adjust simultaneously the positions of said side pens laterally of said sheet to bring the lines drawn by them to the desired distance from the line drawn by said center pen.

4. An apparatus to record an amplification of the variations in the thickness of a fibrous strand comprising means to amplify said variations, a recording pen to mark undulations corresponding to said amplified variations on a sheet of paper moving past said pen, a center pen which marks on said sheet a straight line approximately along the center of said sheet, means including a micrometer to adjust the position of said center pen to indicate the standard average thickness of said strand, two side pens, one on each side of and at the same distance from said center pen, to mark straight lines on said sheet of paper parallel to and equidistant from the line drawn by said center pen and means including a micrometer to adjust simultaneously the positions of said side pens laterally of said sheet to bring the lines drawn by them to the desired distance from the line drawn by said center pen.

5. An apparatus for recording the variations in the thickness of a fibrous strand, comprising a pair of tongue and groove rolls between which the strand is fed and confined under substantially uniform pressure from all directions at right angles to its direction of motion, a pivoted lever in which one of said rolls is journalled, a mechanical link adjustable in length adapted to be moved by said lever during operation of the apparatus on a strand, direct-reading graduations on said link indicating the adjusted length of said link, means to vary the current in an electric circuit in accordance with the movements of said link, means to amplify the variations in said current, a recording pen to make an undulating line record of said amplified variations on a moving sheet of paper, a pen to draw a second central line on said sheet, a third and fourth pen to draw respectively second and third straight lines equally spaced from said central line on each side thereof, a micrometer to simultaneously adjust all of said straight lines laterally of the line drawn by said recording pen, and a second micrometer to simultaneously equally adjust the spacing between each of said second and third lines and said central line.

6. An apparatus for determining and recording the variations in thickness along the length of a fibrous strand which comprises a pair of tongue-and-groove rolls between which the strand is fed and confined under substantially uniform pressure from all directions at right angles to its direction of travel, a movable support in which one of said rolls is journaled and with which it is displaceable toward and from the other roll substantially along a straight line passing through the axes of the rolls, adjustable means acting on said support for urging said rolls toward each other with an adjustable uniform pressure, a link adjustable in length and movable lengthwise along a straight line passing through the axes of the rolls, one end of the link being connected to said support for movement in accordance with the displacement of said displaceable roll during passage of the strand between the rolls, means for varying an electric current in accordance with variations in the position of the other end of said link, graduations on said link indicating the adjusted length of the link, a recording stylus operated by said current for marking on a sheet of paper moving past said stylus a line undulating in accordance with the variations of said current, a second stylus for marking a straight line on said paper, means for adjusting said second stylus transversely of said paper, and graduations for indicating the adjusted position of said second stylus.

7. An apparatus for determining and recording the variations in thickness along the length of a fibrous strand which comprises a pair of tongue-and-groove rolls between which the strand is fed and confined under substantially uniform pressure from all directions at right angles to its direction of travel, one of said rolls being displaceable toward and from the other roll, adjustable means for urging said rolls toward each other with an adjustable uniform pressure, a lengthwise-movable link adjustable in length having one end adapted to be moved in accordance with the displacement of said displaceable roll during passage of the strand between the rolls, means for varying an electric current in accordance with variations in the position of the other end of said link, graduations on said link indicating the adjusted length of the link, a recording stylus operated by said current for marking on a sheet of paper moving longitudinally past said stylus a line undulating in accordance with the variation of said current, a second stylus for marking a straight line on said paper, means for adjusting said second stylus transversely of said paper, and graduations for indicating the adjusted position of said second stylus.

8. An apparatus for determining and recording the variations in thickness along the length of a fibrous strand which comprises a pair of tongue-and-groove rolls between which the strand is fed and confined under substantially uniform pressure from all directions at right angles to its direction of travel, one of said rolls being displaceable toward and from the other roll, adjustable means for urging said rolls toward each other with an adjustable uniform pressure, a link adjustable in length and having one end adapted to be moved in accordance with the displacement of said displaceable roll during passage of the strand between the rolls, means for varying an electric current in accordance with variations in the position of the other end of said link, graduations on said link indicating the adjusted length of the link, a recording stylus operated by said current for marking on a sheet of paper moving longitudinally past said stylus a line undulating in accordance with the variations of said current, a second stylus for marking a straight line on said paper, means for adjusting said second stylus transversely of said paper and graduations for indicating the adjusted position of said second stylus.

9. An apparatus for determining and recording the variations in thickness along the length of a fibrous strand which comprises a pair of tongue-and-groove rolls between which the strand is fed and confined under substantially uniform pressure from all directions at right angles to its direction of travel, one of said rolls being displaceable toward and from the other roll, adjustable means for urging said rolls toward each other with an adjustable uniform pressure, a lengthwise-movable link adjustable in length having one end adapted to be moved in accordance with the displacement of said displaceable roll during passage of the strand between the rolls, means for varying an electric current in accordance with variations in the position of the other end of said link, graduations on said link indicating the adjusted length of the link, a recording stylus operated by said current for marking on a sheet of paper moving longitudinally past said stylus a line undulating in accordance with the variations of said current, a second stylus for marking a first straight line on said paper, a third and a fourth stylus for respectively marking on said paper second and third straight lines each equidistant from, and one on each side of, said first straight line, means for simultaneously and equally adjusting said second, third and fourth styli transversely of said paper, and graduations for indicating the adjusted position thereof, means for adjusting said third and fourth styli simultaneously and equally toward or away from said second stylus, and graduations indicating the adjusted position of said third and fourth styli with respect to said second stylus.

10. An apparatus for determining and recording the variations in thickness along the length of a fibrous strand which comprises a pair of tongue-and-groove rolls between which the strand is fed, one of said rolls being displaceable toward and from the other roll, adjustable means for urging said rolls toward each other with an adjustable uniform pressure, means for varying an electric current in accordance wtih variations in the position of the displaceable roll, a recording stylus operated by said current for marking on a sheet of paper moving longitudinally past said stylus a line undulating in accordance with the variations of said current, a second stylus for marking a first straight line on said paper, a third and a fourth stylus for respectively marking on said paper second and third straight lines each equidistant from, and one on each side of, said first straight line, means for simultaneously and equally adjusting said second, third and fourth styli transversely of said paper and graduations for indicating the adjusted position thereof, means for adjusting said third and fourth styli simultaneously and equally toward or away from said second stylus, and graduations indicating the adjusted position of said third and fourth styli with respect to said second stylus.

11. An apparatus for determining and recording the variations in thickness along the length of a fibrous strand which comprises a pair of tongue-and-groove rolls between which the strand is fed and confined under substantially uniform pressure from all directions at right angles to its direction of travel, a pivoted lever in which one of said rolls is journaled and with which it is displaceable substantially along a straight line toward and from the other roll, adjustable means acting on said lever for urging said rolls toward each other with an adjustable uniform pressure, a link adjustable in length and movable lengthwise along a straight line passing through the axes of the rolls, one end of the link being connected to the lever for movement in accordance with the displacement of said displaceable roll during passage of the strand between the rolls, means for varying an electric current in accordance with variations in the position of the other end of said link, graduations on said link indicating the adjusted length of the link, means for amplifying said current, a recording stylus operated by said amplified current for marking on a sheet of paper moving longitudinally past said stylus a line undulating in accordance with the variations of said current, a second stylus for marking a first straight line on said paper, a third and a fourth stylus for respectively marking on said paper second and third straight lines each equidistant from, and one on each side of, said first straight line, means for simultaneously and equally adjusting said second, third and fourth styli transversely of said paper and graduations for indicating the adjusted position thereof, means for adjusting said third and fourth styli simultaneously and equally toward or away from said second stylus, and graduations indicating the adjusted position of said third and fourth styli with respect to said second stylus.

References Cited in the file of this patent
UNITED STATES PATENTS

| | | |
|---|---|---|
| 55,331 | Merriam | June 5, 1866 |
| 805,912 | Herzog | Nov. 28, 1905 |
| 1,254,062 | Olson | Jan. 22, 1918 |
| 1,255,202 | Messiter | Feb. 5, 1918 |
| 1,411,698 | Hepler | Apr. 4, 1922 |
| 1,540,969 | Walen et al. | June 9, 1925 |
| 1,758,416 | Uehling | May 13, 1930 |
| 1,925,904 | Mayne | Sept. 5, 1933 |
| 2,007,840 | Terry | July 9, 1935 |
| 2,056,918 | Bristol et al. | Oct. 6, 1936 |
| 2,122,818 | Ludrach | July 5, 1938 |
| 2,246,005 | Rich | June 17, 1941 |
| 2,381,990 | Stevens | Aug. 14, 1945 |